United States Patent [19]

F'Geppert

[11] Patent Number: 4,569,427

[45] Date of Patent: Feb. 11, 1986

[54] SHAFT COUPLING DEVICE

[75] Inventor: Erwin F'Geppert, Oakland County, Mich.

[73] Assignee: The United States of American as represented by the Secretary of the Army, Washington, D.C.

[21] Appl. No.: 620,301

[22] Filed: Jun. 13, 1984

[51] Int. Cl.⁴ .................. F16D 11/00; F16D 19/00
[52] U.S. Cl. .................. 192/67 R; 192/82 P
[58] Field of Search .................. 192/67 R, 82 P

[56] References Cited

U.S. PATENT DOCUMENTS

| 1,156,904 | 10/1915 | Johnston | 192/67 R |
| 1,480,021 | 1/1924 | Smith | 192/67 R |
| 1,996,532 | 4/1935 | Varkas | 192/82 P |
| 2,377,575 | 6/1945 | Ringer | 192/82 P |
| 2,770,150 | 11/1956 | Culverwell | 192/67 R |
| 3,727,847 | 4/1973 | Nelson | 192/67 R |
| 3,982,443 | 9/1976 | Fitch | 192/67 R |
| 4,393,965 | 7/1983 | Zouzoulas | 192/82 P |
| 4,482,039 | 11/1984 | Harris | 192/67 R |

FOREIGN PATENT DOCUMENTS 234207 9/1944 Italy .................. 192/82 P

Primary Examiner—Alan Cohan
Assistant Examiner—John A. Rivell
Attorney, Agent, or Firm—Peter A. Taucher; Gail S. Soderling; Robert P. Gibson

[57] ABSTRACT

An improved coupling for driven shafts is formed by juxtaposed bores. A slide core is disposed within the chamber formed by the bores. A plurality of radially extending splines are formed and used to rotatably fasten the core and the shafts. Adjustment means are associated with the core to move the core from an engaged position between and connecting the shafts for rotation to a second disengaged position within one of the bores.

2 Claims, 3 Drawing Figures

SHAFT COUPLING DEVICE

GOVERNMENT INTEREST

The invention described herein may be manufactured, used, and licensed by or for the Government for governmental purposes without payment to me of any royalty thereon.

BACKGROUND

In one aspect this invention relates to power transmission shafts.

In a further aspect this invention relates to power shaft couplings which allow the shaft to be uncoupled for repair and replacement.

Generally it is desirable to make shafts which transmit power as rugged as possible. However, it is desirable to couple power shafts at one or more points in the power train to allow repair. The couplings are generally placed to allow the various major components of the power train to be disconnected and removed from the vehicle to effect maintenance, repair and replacement of the various components.

Power train shafts are often coupled by the use of bolted flanges attached to the ends of the shafts to be coupled or the positioning of a sleeve which surrounds and is fastened to the shaft's ends. The resulting structure is quite strong but the access area necessary for unfastening and disassembly of the couplings is on the order of several inches on each side of the coupling. The space is required because of the need to place tools alongside the coupling.

It would be desirable to provide a coupling which has the strength to be in a drive train yet can be uncoupled using only a minimum amount of access space available for tools.

SUMMARY OF THE INVENTION

One strong coupling which also requires a minimum amount of access space includes first and second shafts. One shaft is connected to a source of power and the second shaft is connected to the output to be driven. The shafts have cylindrical bores with a plurality of longitudinally extending channels formed along the interior bores formed in the ends juxtaposed each other. The channels of the bores are in a one to one correspondence.

A sliding core is disposed within the chamber formed by the bores, the core having a plurality of longitudinal splines extending radially outward. The splines have a one to one correspondence with the channels and are adapted to engage the channels within each bore so when the sliding core bridges the space between the shafts, the shafts are coupled for rotation.

Adjustment means are associated with the core to move it from a first engaged position where it bridges and connects the shafts to a second disengaged position where the core is contained fully within the bore of one shaft so that the shafts are uncoupled.

DETAILED DESCRIPTION

Figure 1:
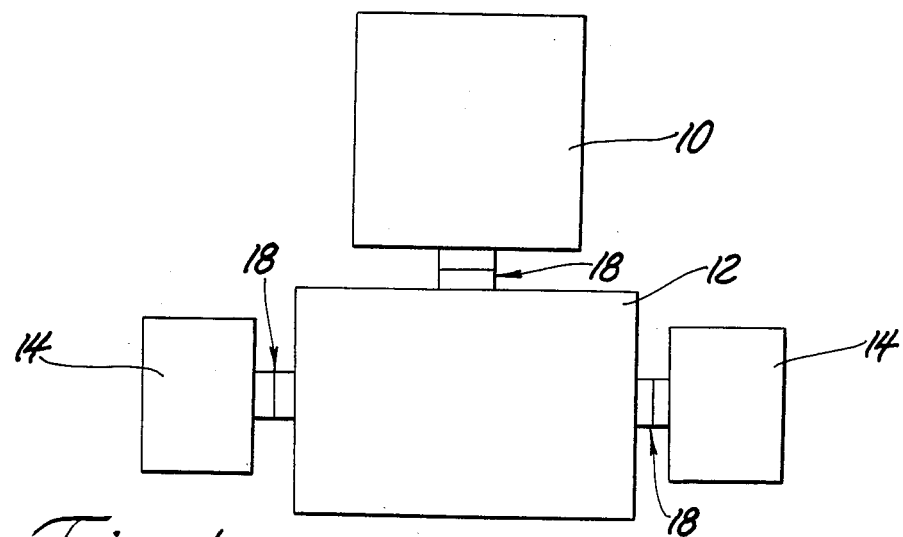
FIG. 1 is a schematic version of a powertrain which could use the coupling of this invention.

Referring to the drawing and initially to FIG. 1, this invention will be described in the context of a power drive train such as is commonly found in tracked vehicles. An engine 10 provides a source of power which drives a transmission 12 which in turn provides forward and reverse power to final drives 14. In a track laying vehicle, the final drives will be cogged wheels which engage the track. Such a drive structure is known in the art. The various components of the system are joined by coupled shafts designated generally 18.

Figure 2:
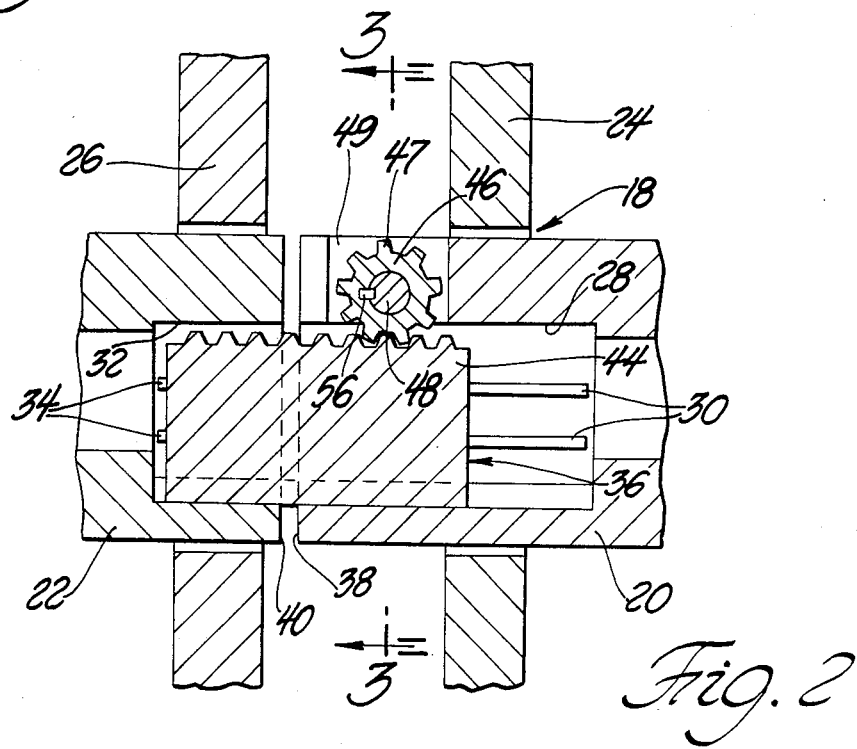
FIG. 2 is a side view in section of one embodiment of this invention.
Figure 3:
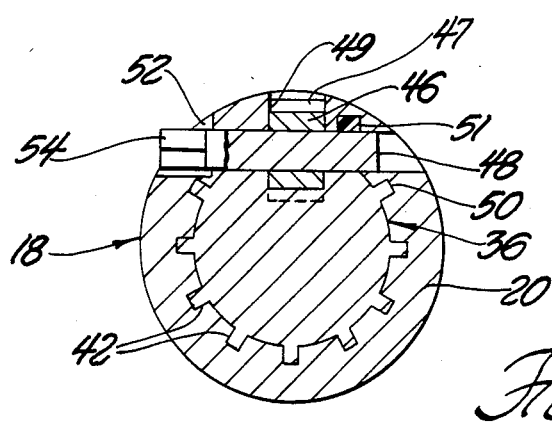
FIG. 3 is a sectional view taken along the plane 3—3 of FIG. 3.

FIGS. 2 and 3 show the coupling 18 of this invention in greater detail. A first powered shaft 20 provides the power input to be transmitted to a driven shaft 22. As shown, the shafts are journaled for rotary motion within frame members 24,26 which are attached to the vehicle, not shown. The mounting of the shafts within the vehicle are within the skill of the art as to bearings and the like and a further discussion is omitted in the interest of brevity.

The first, powered shaft 20, has a cylindrical bore 28 which has a plurality of longitudinally extending channels 30 disposed within. The channels are incised or formed so they extend radially into the shaft as shown most distinctly in FIG. 3.

The second driven shaft 22 has a cylindrical bore 32 which has a second plurality of channels 34 within the bore. The channels 34 and 30 have a one to one correspondence with each channel in one bore having its complimentary channel in the other bore.

A sliding core 36 is disposed within the chamber formed by the cylindrical bores 32,28 when the ends 38,40 of the shafts are brought into juxtaposition. The core 36 has a plurality of longitudinally disposed, radially extending splines formed on the circumference of the core body 44; the splines have a one to one correspondence with the channels 30,34. When the core 36 is in a bridging position, as shown in FIG. 2, the shafts 20,22 are locked with respect to rotation so that power applied to shaft 20 is applied to shaft 22. As shown, the core is splined and the channels are in the shafts. The reverse configuration will also provide a workable coupling. Further, the spline configuration number and size should be adjusted to bear the torque placed on the interface between the shaft and core.

To disengage the shafts, the core 36 can be moved so it is drawn into the bore 28 and is out of contact with the channels 34 of bore 32. In this position the shafts are totally separated and one or more of the drive train's components can be removed from the drive train for repair and replacement.

As illustrated, the means for moving the sliding core 36 is a rack and pinion gear set. The rack 44 is formed on the upper surface of core 36 the rack extending longitudinally along the core. A mating pinion gear 46 has teeth 47 which mesh with the rack 44. The pinion gear 46 is mounted on a rotating adjustment pin 48. The pin 48 is mounted in a sink 49 and journaled for rotation in a tunnel 50. A polymeric plug 51 is mounted within the shaft 20. When the pin 48 is inserted, the plug will be compressed thereby applying a force to the pin which will hinder longitudinal and rotational movement of the pin but allow the pin to be easily rotated with an ordinary hand tool. A section has been removed from the outer surface of shaft 20 to form a recess 52. One end of the pin 48 has a gripping portion or surface 54 formed thereon, the gripping surface being disposed in recess 52 where it can be engaged by a tool to rotate the pin 48 and thereby pinion 46. The rotation will move the sliding core 36 longitudinally within the chamber formed by the bores 28 and 32. The pinion 46 is keyed to the pin 48 by means of a key 56 to prevent rotation of the pinion on the pin but allow assembly and disassembly.

Although the mechanism for moving the core between the coupled and uncoupled position is shown in the driven shaft it could be located in either shaft.

Further, the shaft coupling has been described with reference to a power transmission. The device of this assembly could be used in other environments where the coupling should have a diameter substantially the same diameter as the shaft and it is necessary to separate the shafts for repair and replacement. As shown, there is a gap between the shafts which would allow some longitudinal movement of the shafts without effecting the performance of the coupling.

I wish it to be understood that I do not desire to be limited to the exact details of construction shown and described for obvious modifications will occur to a person skilled in the art, without departing from the spirit and scope of the appended claims.

What is claimed is:

1. A coupling for transmitting power between two shafts including:
    a first shaft said first shaft having a first cylindrical bore therein, the bore coaxially aligned within said first shaft, the bore having a plurality of longitudinally extending channels;
    a second shaft, said second shaft having a second cylindrical bore coaxially aligned within the second shaft and having a plurality of longitudinally extending channels along the bore each channel in the second cylindrical bore having a one to one correspondence to a complimentary channel in the first cylindrical bore and the end of the second shaft containing the second cylindrical bore being juxtaposed the end of said first shaft having the first cylindrical bore;
    a sliding core adapted for longitudinal motion within a chamber formed by the first and second cylindrical bores, said core having a plurality of radially extending splines disposed about and extending longitudinally along the outer surface of said sliding core, the splines being adapted to engage the channels located within the bore so that when the sliding core bridges the space between the first and second shaft the shafts are coupled together for rotation, said sliding core having a rack formed thereon;
    an adjustment pin mounted near the periphery of one of the shafts, said pin having its longitudinal axis disposed in a plane perpendicular to the longitudinal axis of the shaft, said pin having a gripping portion extending outward into a recess in said shaft said gripping portion being adapted to be grasped so as to effect rotation of said pin;
    a pinion gear fixed on said adjustment pin so as to engage the rack on said sliding core so that rotating said pin can move the sliding core from a first coupled portion where the core engages both shafts to couple the shafts so they rotate together to a second uncoupled position where the core is drawn into the shaft containing the pin so the shafts are uncoupled.

2. A power connection including:
    a first power shaft connected to a source of power, said first shaft having a first cylindrical bore therein, the bore being coaxially aligned with said first shaft, the bore having a plurality of longitudinally extending channels located along the bore;
    a second drive shaft connected to an output to be driven, said second shaft having a second cylindrical bore having a plurality of longitudinally extending channels located along the second cylindrical bore, each channel in the second cylindrical bore corresponding to a complimentary channel in the first cylindrical bore the end of the second shaft containing the cylindrical bore being juxtaposed the end of said first shaft having the first cylindrical bore;
    a sliding core disposed within a chamber formed by the first and second cylindrical bores, said core having a plurality of radially extending splines disposed about and extending longitudinally along the outer surface of said sliding core, the splines being adapted to engage the channels located within the bore so that when the sliding core bridges the space between the first and second shaft and couples the shafts together for rotation; said sliding core having a rack formed on one side of the sliding core;
    an adjustment pin is mounted near the periphery of one of the shafts, said pin having its longitudinal axis disposed in a plane perpendicular to the longitudinal axis of the shaft, said pin having a gripping portion extending outward into a recess in said shaft said gripping portion being adapted to be grasped so as to effect rotation of said pin;
    a pinion gear fixed on said adjustment pin so as to engage the rack on said sliding core so that rotating said pin can move the sliding core from a first coupled portion where the core engages both shafts to couple the shafts so they rotate together to a second uncoupled position where the core is drawn into the shaft containing the pin so the shafts are uncoupled.

* * * * *